Figure 1:
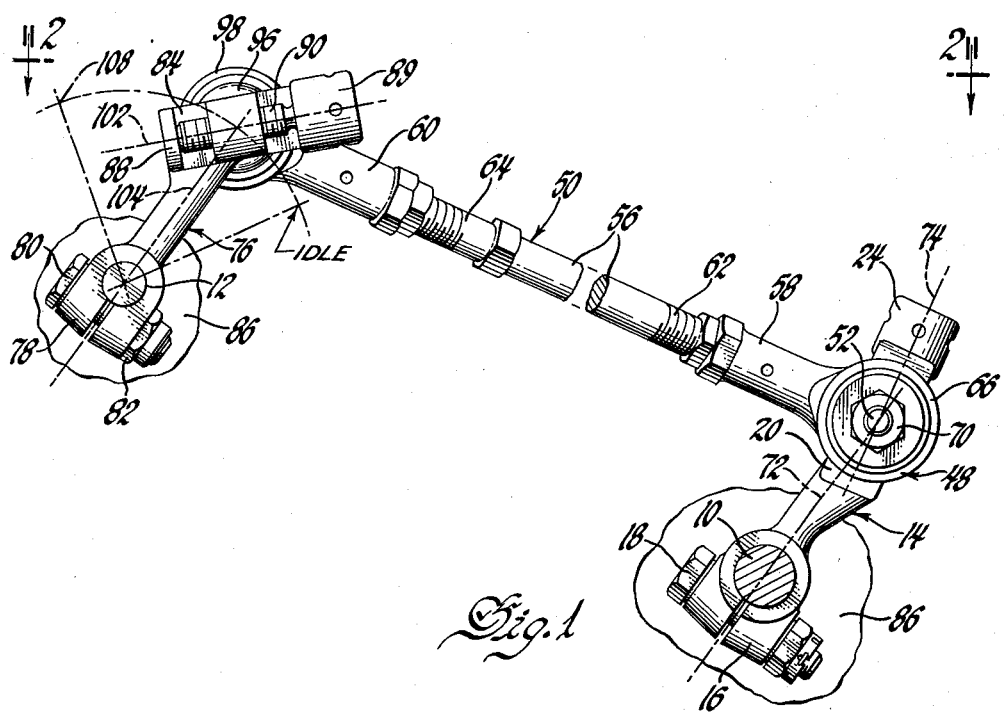

Dec. 19, 1961  W. R. HARDING  3,013,437
ADJUSTABLE LINKAGE
Filed Oct. 10, 1958  2 Sheets-Sheet 1

INVENTOR.
William R. Harding
BY
R. F. Barnard
ATTORNEY

Dec. 19, 1961  W. R. HARDING  3,013,437
ADJUSTABLE LINKAGE
Filed Oct. 10, 1958  2 Sheets-Sheet 2

INVENTOR.
William R. Harding
BY
R. P. Barnard
ATTORNEY

United States Patent Office 3,013,437
Patented Dec. 19, 1961

3,013,437
ADJUSTABLE LINKAGE
William R. Harding, Indianapolis, Ind., assignor to General Motors Corporation, Detroit, Mich., a corporation of Delaware
Filed Oct. 10, 1958, Ser. No. 766,485
2 Claims. (Cl. 74—96)

The present invention relates to a linkage mechanism for connecting a pair of control levers which are adapted to be rotated and thereby positioned in predetermined angular relation to each other at a plurality of points. More specifically, the present invention includes a link adapted to connect a pair of operating levers for co-ordinated operation and further which link and levers are connected by means which permits adjustment between the point of connection of the link and the levers without at the same time varying the relative angular positions of the levers.

While the present invention is of general applicability, it has been particularly designed for use with an aircraft engine control system where it is common to use a single operator controlled coordinator lever to control a plurality of engine functions such as fuel and throttle setting controls. With such a coordinated control system it is frequently extremely difficult to adjust the operation of one part of the engine control system without at the same time modifying or affecting the remainder of the system. Even more importantly it is frequently difficult to adjust one of the engine control functions, e.g. fuel control, such that the fuel setting is correct for more than one operating condition.

To make the illustration a little more specific, the present invention can be visualized as adapted for use on a turbine type engine in which the flow of fuel is particularly critical under at least two conditions. For instance, it might be desirable to accurately set the flight idle position and the take-off position of the fuel control lever. Heretofore it has been impossible to make a proper setting of the fuel control lever for one of these positions without having to make a series of other adjustments to compensate for changes in any other position of the lever. This situation has made it extremely difficult and time consuming to make the appropriate adjustments in an aircraft control system.

The present invention relates to a considerably simplified adjustable linkage arrangement in which it is possible to easily adjust for specific positioning of one lever of the system without, at the same time, affecting the position of another lever of the system.

In the present invention a pair of control arms are fixed upon shafts having generally parallel axes and further which control arms are adapted to be interconnected by a common link. In this way rotation of one of the control arms will affect a rotation of the other control arm. The present invention is directed to providing adjusting means through which the respective control arms are connected to the common link which permit adjustments to be made between each arm and the link so that a predetermined angular movement of one of the control arms will insure the proper angular disposition of the other control arm.

In the subject adjustable linkage, the adjusting means by which the angular actuation of each control arm is modified is a part of the means whereby the other control arm is connected to the link. In other words, to adjust the angular position of one of the control arms the means by which the other arm is connected to the control link is adjusted to vary the radial displacement of the pivotal connection between the latter arm and the link relative to the shaft of the latter arm.

In the subject invention each adjusting means includes a slide formed at one end of the operating rod and the axis of which slide is inclined to the operating arm axis. The slide angle is related to the opposite operating arm in such a way that movement of the link pivot point which is disposed within said slide may take place without thereby affecting an angular movement of either operating arm.

Other objects and advantages will be apparent from a perusal of the detailed description which follows.

Figure 2:
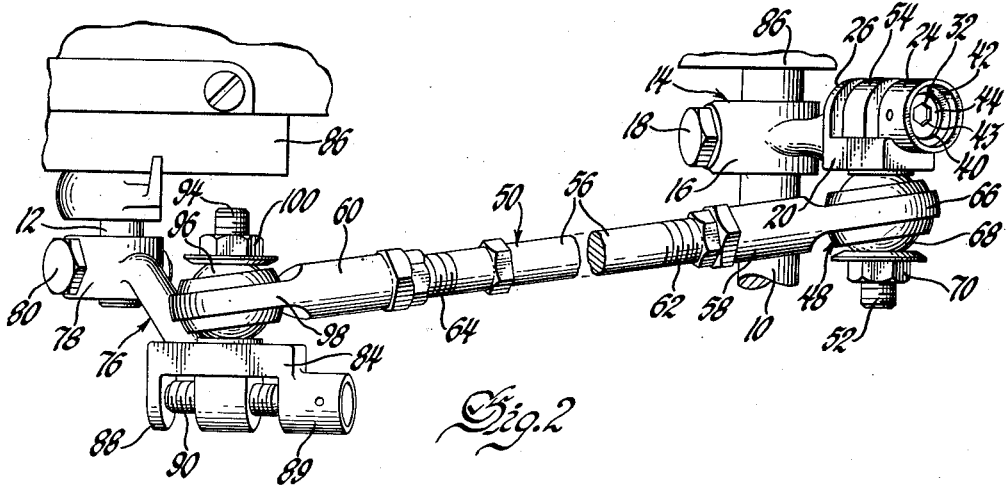
Figure 3:
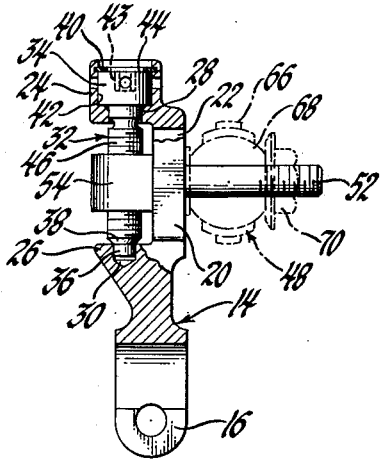
Figure 4:
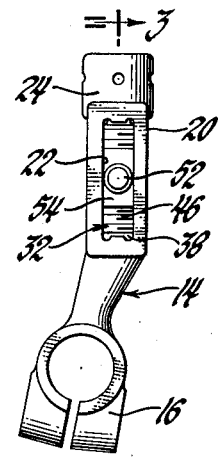
Figure 5:
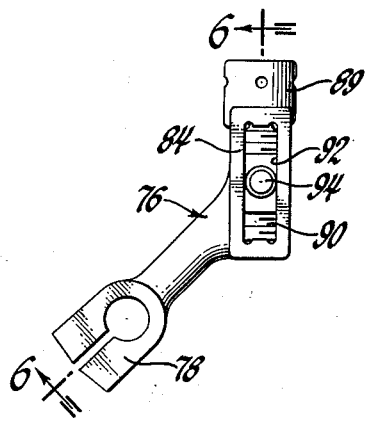
Figure 6:
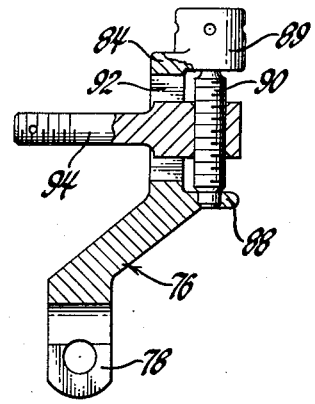

In the drawings:
 FIGURE 1 is an elevational view of the subject linkage;
 FIGURE 2 is a plan view of the linkage;
 FIGURES 3 and 4 are detail views of one of the control arms; and
 FIGURES 5 and 6 are detail views of the other control arm.

As already noted, while the present invention is not limited in its application thereto, it has been particularly adapted for use with an aircraft engine control system and more particularly for that part of the system which includes control of fuel flow. It is particularly critical that accurate and simple adjustments can be made in this part of the system in such a way as not to upset the remainder of the controls which may be coordinated with the fuel control.

The illustrated form of the subject invention is particularly adapted for use with a turbine type engine in which a coordinator shaft 10 is provided and which shaft is adapted to be controlled or rotated by a master control lever, not shown, and the actuation of which lever is adapted to vary several aspects of engine operation such as propeller, throttle and fuel controls. The present invention is described in relation to the control of fuel which may be achieved in any well known manner through the rotation of a shaft 12. Shafts 10 and 12 include substantially parallel center lines.

Referring particularly to FIGURE 1, a first operating arm 14 is mounted on coordinator shaft 10 for rotation therewith. Arm 14 is mounted upon shaft 10 through a split hub portion 16 which includes a nut and bolt clamping device 18 permitting a basic angular adjustment between the arm and the shaft. By this latter means the basic angular setting of the operating arm may be made with the final and most accurate adjustment being made by means to be discussed subsequently.

Arm 14 includes a radially offset portion 20 which, as best seen in FIGURES 3 and 4, includes an open slide 22 and a pair of outwardly extending trunnion-like members 24—26. Axially aligned non-threaded openings 28 and 30 are respectively formed through trunnion members 24—26. An adjusting screw member 32 includes a pair of non-threaded ends 34 and 36 through which the screw is supported within the trunnion members. End 34 of screw 32 is of a reduced diameter such that a shoulder 38 is formed which will seat against trunnion member 26 to limit the axial movement of the screw. Movement of the screw in the opposite axial direction is precluded by the insertion of a snap ring 40 within a counterbored portion 42 of trunnion member 24. A polygonal depression 43 is formed in the head 44 of screw 32 and is adapted to receive a correspondingly formed tool to permit rotation of the screw for adjustment purposes as will be subsequently considered.

Screw 32 includes a threaded section 46 intermediate the unthreaded end portions 34 and 36.

A ball and socket connector device is shown generally at 48 and is the means whereby lever arm 14 is connected to one end of a control link 50. Referring to FIGURE 2, device 48 includes a stud member 52 adapted to extend through slide 22 and terminating in an enlarged flattened end portion 54. Portion 54 of stud 52 includes a threaded opening therethrough and which opening is adapted to receive the threaded portion 46 of adjusting screw 32. As best seen in FIGURE 3, as screw 32 is rotated stud 52 will be moved axially thereof. The purpose of this axial adjustment of stud 52 will be considered subsequently.

Control link 50 is a built-up member and includes a center section 56 and substantially identical end sections 58 and 60. End sections 58 and 60 are internally threaded to receive corresponding externally threaded portions 62 and 64 of section 56 whereby the length of the link 50 may be adjusted when the linkage is initially installed in position.

Link end section 58 includes a circular end section 66 having a hemispherically shaped recess therein adapted to receive a ball member 68. Ball member 68 includes an axial opening therethrough adapted to receive the stud member 52. The outer end of stud 52 is threaded to receive a nut member 70 whereby the stud and ball member are connected together which in turn connects the control arm 14 to link 50.

Referring again to FIGURE 1, it will be noted that a line of centers 72 may be drawn between the axis of coordinator shaft 10 and the axis of stud 52 the latter which, in conjunction with ball 68, provides the point of articulation between link 50 and control arm 14. It will be further noted that the axis 74 of slide 22 is angularly offset or inclined with relation to the aforementioned line of centers 72. This inclined relationship of slide 22 to the remainder of arm 14 constitutes an important part of the present invention, the purpose of which will be considered in greater detail after the remainder of the linkage system has been described.

A second control arm or lever 76 is fixed to fuel control shaft 12. A similar split hub 78, bolt 80 and nut 82 provides the means whereby the arm is fixed to the shaft permitting the same type of basic adjustment as described in relation to control arm 14. Functionally, the construction of arm or lever 76 and the means by which it is articulated to link 50 is substantially identical with the previously described means relative to lever 14. However, certain structural variations do obtain between the levers 14 and 76 which will be noted as the description proceeds.

Lever 76 includes a portion 84 which in addition to being radially offset with respect to hub 78 is also slightly axially offset as best seen in FIGURE 2. The purpose of axially offsetting portion 84 being to provide suitable clearance between the arm 76 and its link connecting means from the engine structure 86 on which it is mounted. Lever portion 84 also includes trunnion portions 88 and 89 for rotatably supporting an adjusting screw 90. As seen in FIGURES 1 and 6, lever portion 84 also includes a slide 92 formed therein through which a stud member 94 extends for cooperation with adjusting screw 90 to permit the stud to be axially adjusted within the slide. Here again a ball member 96 is mounted on stud 94 and cooperates with a socket portion 98 of link end portion 60. Ball 96, link 50 and lever 76 are held together through a nut 100 mounted on the threaded portion of stud 94. Link end portion 60 is also internally threaded to receive threaded portion 64 of center link section 56 to permit adjustment in the length of the link.

The axis 102 of slide 92 is angularly inclined to the line of centers 104 drawn between the axes of shaft 12 and stud 94. This angular relationship while somewhat greater in extent is for the same purpose as that obtaining with respect to lever 14 and more of which will be subsequently considered.

With the linkage as thus far described, it is apparent that when the coordinator shaft 10 is rotated a similar rotation will be imparted to shaft 12 through levers 14 and 76 and link 50. In the past when it was desired to make an angular adjustment of either of the levers 14 and 76, it was the practice to provide adjustment means between the arms or levers and the point of articulation to the interconnecting link. Such adjustment means, however, were constructed so that the points of articulation were adjusted on a radius between the axis of one of the shafts and its point of articulation with the common connecting link, or in the invention as shown, the adjustment would be along either of the center lines 72 or 104. It is apparent, however, that any such in or out adjustment of the point of articulation on such a radius would inevitably cause one or the other or both of the control levers and hence the attached shafts to also be moved to a limited extent.

It is the inability of previous devices to adjust or correct one position of one control arm without requiring additional compensating corrections which the present mechanism overcomes. This will become clear by making a further illustration of the operation of the subject device. First, it is to be noted that in such a fuel control system there are probably at least two positions of the fuel control lever 76 which must be accurately maintained. These positions are the flight idle position and the take-off or full power position. Assume now that with the levers in the position shown in FIGURE 1, the fuel control lever 76 is set exactly right for the flight idle condition. Assume further that upon the rotation of the coordinator shaft 14 to achieve a full power take-off condition, fuel control lever 76 does not reach the proper angular position for the requisite fuel flow. It, therefore, becomes necessary to make an adjustment in the control linkage to correct for the inaccurate positioning of the fuel control lever during the power take-off condition. At the same time it is desired to make such an adjustment without affecting the flight idle position of the lever, which as already noted, is accurately set.

The angular correction of the position of fuel control lever 76 for power take-off operation is made by rotating adjusting screw 32 on arm 14 so as to move the point of articulation, or stud 52, inwardly or outwardly within slide 22 whereby the distance between the axis of shaft 10 and the axis of the stud, and hence the effective length of arm 14, is varied to the extent necessary to bring the fuel control lever to the proper position when the coordinator shaft is rotated to achieve power take-off operation.

Due to the angular inclination of slide 22 with respect to center line 72, the aforenoted in and out movement of the point of articulation between lever 14 and link 50 is affected without imparting any movement to either the levers 14 or 76. It is apparent that if this inward and outward adjustment of stud 52 were made along center 72, as in the past, such movement would, assuming the position of lever 14 were fixed, affect an angular movement of lever 76 thereby upsetting the correct fuel-idle position of the latter lever.

To make the above illustration of the adjustment of lever 76 a little more specific, let it be assumed that lever 76 is to be rotated in a counterclockwise direction to an arbitrary point 108 to reach the full power take-off fuel position and that when such a selection is made through actuation of coordinator shaft 10 lever 76 falls arcuately short of reaching the aforenoted point. To compensate the linkage in this case, it is thus necessary to rotate adjusting screw 32 such that stud 52 moves outwardly within slide 22. In this way the effective length of lever 14, with respect to link 50, is increased and additional arcuate movement imparted to lever 76 sufficient to bring the same to the appropriate full power position.

The same type of adjustment may be made where the power take-off fuel setting of lever 76 is correct but where an adjustment of the flight idle position is required. In this case, however, with lever 76 in the full power position 108, the idle power adjustment is made by rotating adjusting screw 90 to vary the effective length of arm 76.

The advantage in thus being able to adjust any one of a plurality of positions of the fuel control lever 76 in such a way as not to upset another position setting of

I claim:

1. A linkage system comprising a pair of spaced shaft members having substantially parallel axes, a lever fixed for rotation on each of said shaft members respectively, a link member, pivotal connecting means articulating said levers to said link member at points remote from the axis of the respective shaft members whereby rotation of one of said shafts will impart a similar rotation to the other shaft member, an open slide in each of said levers, said pivotal connecting means being received within each of said open slides, means for adjusting said connecting means within said slides, each connecting means including an axis of rotation generally parallel to the axes of said shaft members, each lever slide being inclined to a line of centers between the connecting means and shaft member axes associated therewith such that adjustments of each connecting means within said slide will vary the effective lengths of said levers without angularly moving either of said levers.

2. A linkage system comprising a pair of spaced shaft members having substantially parallel axes, a lever fixed for rotation on each of said shaft members respectively, a link member, pivotal connecting means articulating said levers to said link member at points remote from the axes of the respective shaft members whereby rotation of one of said shafts will impart a similar rotation to the other shaft member, an open slide in each of said levers, said levers comprising a radially offset portion containing said slides, said pivotal connecting means being received within each of said open slides, means for adjusting said connecting means within said slides, each connecting means including an axis of rotation generally parallel to the axes of said shaft members, said radially offset portions being inclined to a line of centers between the connecting means and shaft member axes associated therewith such that adjustments of each connecting means within said slide will vary the effective lengths of said levers without angularly moving either of said levers.

References Cited in the file of this patent

UNITED STATES PATENTS

| | | |
|---|---|---|
| 620,939 | Lee | Mar. 14, 1899 |
| 957,474 | Parker | May 10, 1910 |
| 1,213,639 | Henley | Jan. 23, 1917 |
| 1,870,283 | Crawford | Aug. 9, 1932 |
| 2,197,730 | Mugford | Apr. 16, 1940 |
| 2,296,485 | Whitworth | Sept. 22, 1942 |
| 2,330,955 | Crane | Oct. 5, 1943 |
| 2,747,509 | Pool | May 29, 1956 |
| 2,834,218 | Lovell | May 13, 1958 |

FOREIGN PATENTS

| | | |
|---|---|---|
| 61,504 | Switzerland | Sept. 20, 1912 |
| 920,696 | Germany | Oct. 21, 1954 |